United States Patent
Frihauf et al.

(10) Patent No.: US 9,755,396 B1
(45) Date of Patent: Sep. 5, 2017

(54) EUV LPP SOURCE WITH IMPROVED DOSE CONTROL BY COMBINING PULSE MODULATION AND PULSE CONTROL MODE

(71) Applicant: ASML Netherlands B.V., Veldhoven (NL)

(72) Inventors: Paul Frihauf, La Jolla, CA (US); Andrew Liu, San Diego, CA (US); Spencer Rich, Veldhoven (NL); Matthew R. Graham, San Diego, CA (US); Steven Chang, San Diego, CA (US); Wayne J. Dunstan, San Diego, CA (US); Daniel Jason Riggs, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 15/363,570

(22) Filed: Nov. 29, 2016

(51) Int. Cl.
| | |
|---|---|
| *H01S 3/10* | (2006.01) |
| *H05G 2/00* | (2006.01) |
| *H01S 3/102* | (2006.01) |
| *H01S 3/106* | (2006.01) |
| *H01S 3/107* | (2006.01) |

(52) U.S. Cl.
CPC ............ *H01S 3/102* (2013.01); *H01S 3/107* (2013.01); *H01S 3/1068* (2013.01); *H05G 2/003* (2013.01); *H05G 2/008* (2013.01)

(58) Field of Classification Search
CPC ........ H01S 3/102; H01S 3/1068; H01S 3/107; H05G 2/003; H05G 2/008
See application file for complete search history.

(56) References Cited

U.S. PATENT DOCUMENTS

| | | | | |
|---|---|---|---|---|
| 2013/0099140 A1* | 4/2013 | Nakarai | ................ | H01S 3/0057 250/493.1 |
| 2013/0234051 A1* | 9/2013 | Rajyaguru | .......... | G03F 7/70033 250/504 R |
| 2014/0102875 A1* | 4/2014 | De Dea | ................. | C23C 14/185 204/157.15 |
| 2014/0191132 A1* | 7/2014 | Schafgans | .............. | H05G 2/003 250/372 |

(Continued)

*Primary Examiner* — Mark R Gaworecki
(74) *Attorney, Agent, or Firm* — Gard & Kaslow LLP (57) ABSTRACT

A method and apparatus for control of a dose of extreme ultraviolet (EUV) radiation generated by a laser produced plasma (LPP) EUV light source that combines pulse control mode and pulse modulation. The EUV energy created by each pulse is measured and total EUV energy created by the fired pulses determined, a desired energy for the next pulse is determined based upon whether the total EUV energy is greater or less than a desired average EUV energy times the number of pulses. If the desired pulse energy for the next droplet is within the range of one or more pulse modulation actuators, the pulse is modulated; otherwise, the pulse is fired to miss the droplet. This provides greater control of the accumulated dose as well as uniformity of the EUV energy over time, greater ability to compensate for pulses that generate EUV energy that is higher or lower than nominal expected values, and ability to provide an average EUV energy per pulse that is less than the nominal minimum EUV energy per pulse of the system.

19 Claims, 6 Drawing Sheets

(56) References Cited

U.S. PATENT DOCUMENTS

| | | | | |
|---|---|---|---|---|
| 2014/0191133 A1* | 7/2014 | Crouch | .................. | H05G 2/003 250/372 |
| 2014/0233005 A1* | 8/2014 | Crouch | ................... | H05G 2/008 355/67 |
| 2014/0346375 A1* | 11/2014 | Nowak | ............... | H01S 3/10015 250/504 R |
| 2015/0034845 A1* | 2/2015 | Shu | ........................ | H05G 2/008 250/504 R |
| 2016/0044772 A1* | 2/2016 | Graham | ................. | H05G 2/008 137/13 |
| 2016/0073487 A1* | 3/2016 | Yanagida | ............... | H05G 2/006 250/504 R |
| 2016/0087389 A1* | 3/2016 | Niwano | .............. | H01S 3/10015 250/504 R |
| 2017/0048959 A1* | 2/2017 | Riggs | .................... | H05G 2/008 |
| 2017/0048960 A1* | 2/2017 | Riggs | .................... | H05G 2/008 |

\* cited by examiner

EUV LPP SOURCE WITH IMPROVED DOSE CONTROL BY COMBINING PULSE MODULATION AND PULSE CONTROL MODE

FIELD OF THE INVENTION

The present invention relates generally to laser produced plasma (LPP) extreme ultraviolet (EUV) light sources. More specifically, the invention relates to a method and apparatus for improving the control of a dose of EUV radiation generated by an LPP EUV light source to be applied to an item, such as a semiconductor wafer, being processed.

BACKGROUND OF THE INVENTION

The semiconductor industry continues to develop lithographic technologies which are able to print ever-smaller integrated circuit dimensions. Extreme ultraviolet ("EUV") light (also sometimes referred to as soft x-rays) is generally defined to be electromagnetic radiation having wavelengths of between about 5 and 120 nm. EUV lithography is currently generally considered to include EUV light at wavelengths in the range of about 10-14 nm, and is used to produce extremely small features, for example, sub-32 nm features, in substrates such as silicon wafers. These systems must be highly reliable and provide cost effective throughput and reasonable process latitude.

Methods to produce EUV light include, but are not necessarily limited to, converting a material into a plasma state that has one or more elements, e.g., xenon, lithium, tin, indium, antimony, tellurium, aluminum, etc., with one or more emission line(s) in the EUV range. In one such method, often termed laser produced plasma ("LPP"), the required plasma can be produced by irradiating a target material, such as a droplet, stream or cluster of material having the desired line-emitting element, with a laser pulse at an irradiation site. The target material may contain the spectral line-emitting element in a pure form or alloy form, for example, an alloy that is a liquid at desired temperatures, or may be mixed or dispersed with another material such as a liquid.

In one common embodiment, a droplet generator heats the target material and extrudes the heated target material as a series of droplets that travel along a trajectory to the irradiation site to intersect a corresponding series of laser pulses. Ideally, the irradiation site is at one focal point of a reflective collector. When a laser pulse hits a droplet at the irradiation site, the droplet is vaporized and the reflective collector causes the resulting EUV light output to be maximized at another focal point of the collector. When subsequent droplets are hit with subsequent laser pulses, further EUV light output is provided.

LPP EUV systems are typically "MOPA" systems, in which a master oscillator and power amplifier form a source laser which may be fired as and when desired, and "MOPA PP" ("MOPA with pre-pulse") systems in which a droplet is sequentially illuminated by more than one light pulse. In a MOPA PP system, a "pre-pulse" is first used to heat, vaporize or ionize the droplet and generate a weak plasma, followed by a "main pulse" which converts most or all of the droplet material into a strong plasma to produce EUV light emission.

One issue is that it is desirable, and in fact important, to be able to control the amount, or "dose," of EUV light energy being applied to a particular item being treated, such as a semiconductor wafer. For example, a specified amount of EUV light energy may be required to accomplish some task, such as curing a layer of photoresist, on a semiconductor wafer as part of the manufacturing process. In order to obtain consistent results across different wafers, it will be desirable to apply the same amount of EUV light energy to each wafer, to as great a degree of accuracy as possible, and in a uniform manner.

This is complicated by the fact that the power in each laser pulse may vary. Since the amount of EUV energy released when a laser pulse hits a droplet varies with the power in the laser pulse and other factors, the EUV light energy generated by any given droplet may also vary.

At present there are two ways that such dose control is accomplished in an EUV source. One is known as pulse control mode, and the other is called pulse modulation.

In pulse control mode, the laser pulses, and thus the corresponding droplets, are divided into "packets" or groups of pulses (and droplets). In earlier implementations, a packet may typically include 50 pulses, but packets of as few as 15 pulses have also been used. Later implementations may use packets of as few as 5 pulses, or even, in "distributed pulse control mode," as little as a single pulse. A dose target is selected, which each packet is intended to meet.

The integrated EUV energy of a packet is controlled to achieve the dose target. The EUV energy generated by each pulse hitting a corresponding droplet is measured. For each packet, a total accumulated dose is then calculated by adding the energy from each droplet over the series of droplets, starting with the first droplet in the packet. Once the dose target for the packet is achieved, the rest of the pulses in that packet are "skipped" or "missed," i.e., droplets are not hit by the laser pulses. Skipping a droplet is typically accomplished either by firing the laser at a location other than the irradiation site at which the droplet is located, or by firing the laser at a time such that a droplet will not be at the irradiation site when the laser pulse arrives there.

One problem with earlier implementations of pulse control mode is that due to the variation in laser pulse energy, and thus in the EUV energy generated by each droplet, different packets may end up with very different numbers of pulses that actually generate energy. Any energy that might have been generated by a droplet that is skipped is wasted.

Since the pulses that do not generate EUV energy are all at the ends of the packets in early implementations of pulse control mode, there will be gaps between EUV pulse trains in sequential packets, and these gaps will also have a variable duration. In some cases, the target dose might be met by 10 droplets of a 15 droplet packet, with the remaining 5 droplets not hit, or 30 droplets of a 50 droplet packet, with the remaining 20 droplets not hit, resulting in gaps of 33% and 40% of the packet respectively. Still further, the moving average of EUV energy over time may have variations that are larger than desirable.

Even in later implementations of pulse control mode, there is a resolution limit, i.e., energy can only be controlled in increments of the amount of the energy contained in a single pulse. Further, the EUV energy created also heats up the EUV plasma, and the variation in the EUV energy in different pulse trains will thus cause the temperature of the plasma to also vary from packet to packet. This variation in temperature can lead to a less stable plasma and in turn cause further variations in the EUV pulse energy. As a result, a larger "dose margin," the difference between the maximum power that the system can theoretically produce and the amount of power that is desired, is required in order to insure that the dose target will be consistently met. The increased dose margin reduces the effective EUV power that can be achieved in the EUV source.

Some of these concerns, particularly related to large gaps between droplets being hit by pulses, are reduced in a modified form of pulse control mode that is described in pending U.S. patent application Ser. No. 14/975,436, which is commonly owned by the assignee of the present application.

The pulse modulation approach to dose control attempts to avoid plasma instabilities by eliminating the gaps that occur in packet-based dose control. Instead of skipping droplets, the pulse energy of each laser pulse is controlled by adjusting either the duration of the pulse or the magnitude of the pulse from the master oscillator of the source laser, or the amount of amplification of that pulse by the amplifier(s) in the system.

If the energy of each pulse can be adjusted sufficiently downward from its maximum energy, in theory no droplets need be missed, thus reducing wasted energy and requiring fewer pulses to reach a target dose, as well as reducing the variation in plasma temperature described above that can occur with pulse control mode and allowing for a smaller dose margin.

However, the pulse modulation approach has different problems than pulse control mode. One such problem is that the ability to adjust the energy of a pulse downward is limited. Adjustment of the pulse duration and magnitude from the source laser is accomplished by use of an actuator such as an electro-optic modulator (EOM), which adjusts the time duration of the pulse, also known as the "pulse width," and/or an acousto-optic modulator (AOM), which adjusts the magnitude of the pulse. Adjustment of the amount of amplification of the pulse from the source laser is accomplished by modulating radio frequency (RF) energy applied to the amplifier(s), which controls the energy in the carbon dioxide gain medium in the amplifier(s).

Due to limitations in the electronics driving such devices, there is a minimum width, amplitude and amplification that can be applied to a pulse, which places a de facto lower limit on a target dose, equal to the energy generated by a sequence of pulses all at the minimum energy.

In various situations, it may be helpful to have techniques and tools to control a dose of EUV radiation generated by an LPP EUV light source that provides a greater range of EUV energy output than pulse modulation, and without creating large gaps between EUV pulse trains as in pulse control mode.

SUMMARY OF THE INVENTION

Disclosed herein are a method and apparatus for improving the control of a dose of EUV radiation generated by an LPP EUV light source and to be applied to an item, such as a semiconductor wafer, being processed.

In one embodiment, a method is disclosed for controlling a dose of extreme ultraviolet (EUV) radiation generated by a laser produced plasma (LPP) EUV light source, the LPP EUV light source creating EUV energy by firing source laser pulses that are modulated in energy by one or more actuators such that each pulse has a range from a minimum pulse energy to a maximum pulse energy, the pulse energy corresponding to a nominal amount of EUV energy to be produced by the pulse, and capable of hitting droplets of target material with a laser pulse, comprising: receiving, by a controller, a selected EUV dose target and a number of laser pulses over which the dose target is to be achieved; determining, by the controller, a desired average EUV energy per pulse to be generated in order to achieve the dose target over the number of laser pulses; causing, by the controller, the light source to fire a pulse to hit a droplet; measuring, by a sensor, the EUV energy created by the laser pulse hitting the droplet; adding, by the controller, the measured EUV energy to a running total of the EUV energy generated by laser pulses that have been fired; determining, by the controller, a difference between the running total of the EUV dose and the desired average EUV energy per pulse times the number of pulses fired and, from the determined difference, a desired pulse energy for a next laser pulse; if the desired pulse energy for the next laser pulse is within the range of pulse energy that may be modulated by the actuators: causing, by the controller, the light source to fire a next laser pulse to hit a subsequent droplet; and causing, by the controller, one or more of the actuators to modulate the pulse energy of the next laser pulse to the desired pulse energy; and if the desired pulse energy for the next laser pulse is not within the range of the actuators: causing, by the controller, the light source to fire a next laser pulse to not hit a droplet.

Another embodiment discloses a system for controlling a dose of extreme ultraviolet (EUV) radiation generated by a laser produced plasma (LPP) extreme EUV light source, the LPP EUV light source creating EUV energy by firing source laser pulses capable of hitting droplets of target material with a laser pulse, comprising: one or more actuators configured to modulate the energy of a laser pulse, having a range from a minimum pulse energy to a maximum pulse energy, the pulse energy corresponding to a nominal amount of EUV energy to be produced by the laser pulse; a sensor configured to measure the EUV energy created by a laser pulse hitting a droplet; a controller configured to: receive a selected EUV dose target and a number of laser pulses over which the dose target is to be achieved; determine the desired average EUV energy per pulse to be generated in order to achieve the dose target over the number of laser pulses; cause the light source to fire a laser pulse hit a droplet; add the measured EUV energy created by each laser pulse to a running total of the EUV energy generated by laser pulses that have been fired; determine the difference between the running total of the EUV dose and the desired average EUV energy per pulse times the number of pulses fired and, from the determined difference, a desired pulse energy for a next laser pulse; if the desired pulse energy for a next laser pulse is within the range of pulse energy that may be produced by the actuators: cause the light source to fire a next laser pulse to hit a droplet; and cause one or more of the actuators to modulate the pulse energy of the next laser pulse to the desired pulse energy; and if the desired pulse energy for the next laser pulse is not within the range of the actuators: cause the light source to fire a next laser pulse to not hit a droplet.

Still another embodiment discloses a non-transitory computer readable storage medium having embodied thereon instructions for controlling a dose of extreme ultraviolet (EUV) radiation generated by a laser produced plasma (LPP) EUV light source, the LPP EUV light source creating EUV energy by firing source laser pulses that are modulated in width by an actuator having a range from a minimum width to a maximum width, the width corresponding to a nominal amount of EUV energy to be produced by the pulse, and capable of hitting droplets of target material with a laser pulse, the method comprising: receiving, by a controller, a selected EUV dose target and a number of laser pulses over which the dose target is to be achieved; determining, by the controller, a desired average EUV energy per pulse to be generated in order to achieve the dose target over the number of laser pulses; causing, by the controller, the light source to fire a pulse to hit a droplet; measuring, by a sensor, the EUV energy created by the laser pulse hitting the droplet; adding, by the controller, the measured EUV energy to a running total of the EUV energy generated by laser pulses that have been fired; determining, by the controller, a difference between the running total of the EUV dose and the desired average EUV energy per pulse times the number of pulses fired and, from the determined difference, a desired width for a next laser pulse; if the desired pulse energy for the next laser pulse is within the range of pulse energy that may be produced by the actuators: causing, by the controller, the light source to fire a next laser pulse to hit a subsequent droplet; and causing, by the controller, the one or more of the actuators to modulate the pulse energy of the next laser pulse to the desired pulse energy; and if the desired pulse energy for the next laser pulse is not within the range of the actuator: causing, by the controller, the light source to fire a next laser pulse to not hit a droplet.

DETAILED DESCRIPTION OF THE INVENTION

The present application describes a method and apparatus for improving the control of a dose of EUV radiation generated by a laser produced plasma (LPP) extreme ultraviolet (EUV) light source and to be applied to an item, such as a semiconductor wafer, being processed.

In one embodiment, pulse control mode is combined with pulse modulation to create a hybrid control method. A dose target is selected to achieve a desired effect on the item being processed, and a number of pulses selected over which the dose target is to be created. From this, a desired average EUV energy to be generated by each laser pulse is determined in order to arrive at the selected dose target. The EUV energy created by each pulse is measured and a total EUV energy created by the pulses fired is determined. A desired energy for the next pulse is determined based upon whether the total EUV energy created thus far is greater or less than the desired average EUV energy times the number of pulses fired so far.

If the desired pulse energy for the next droplet is within the pulse modulation actuator's range, the pulse is modulated to provide a pulse having a width expected to provide the desired pulse energy. If the desired pulse energy is too low, such that it is outside the pulse modulation actuator range, the droplet is skipped by firing the pulse off target.

This combination of pulse modulation and the skipping of pulses as in pulse control mode allows for greater control of the total accumulated dose as well as uniformity of the generated EUV energy over time, and a greater ability to compensate for pulses that generate EUV energy that is higher or lower than the nominal expected values. In particular, the combination of these techniques allows a system to provide an average EUV energy per pulse that is less than the nominal minimum EUV energy per pulse that the system is capable of producing.

The two modes of operation can share the same energy sensor and controller for measuring produced EUV energy and determining the total energy produced by all pulses. However, different actuators will typically be used to respond to the controller commands needed to provide both pulse modulation and firing on or off droplet.

Figure 1:
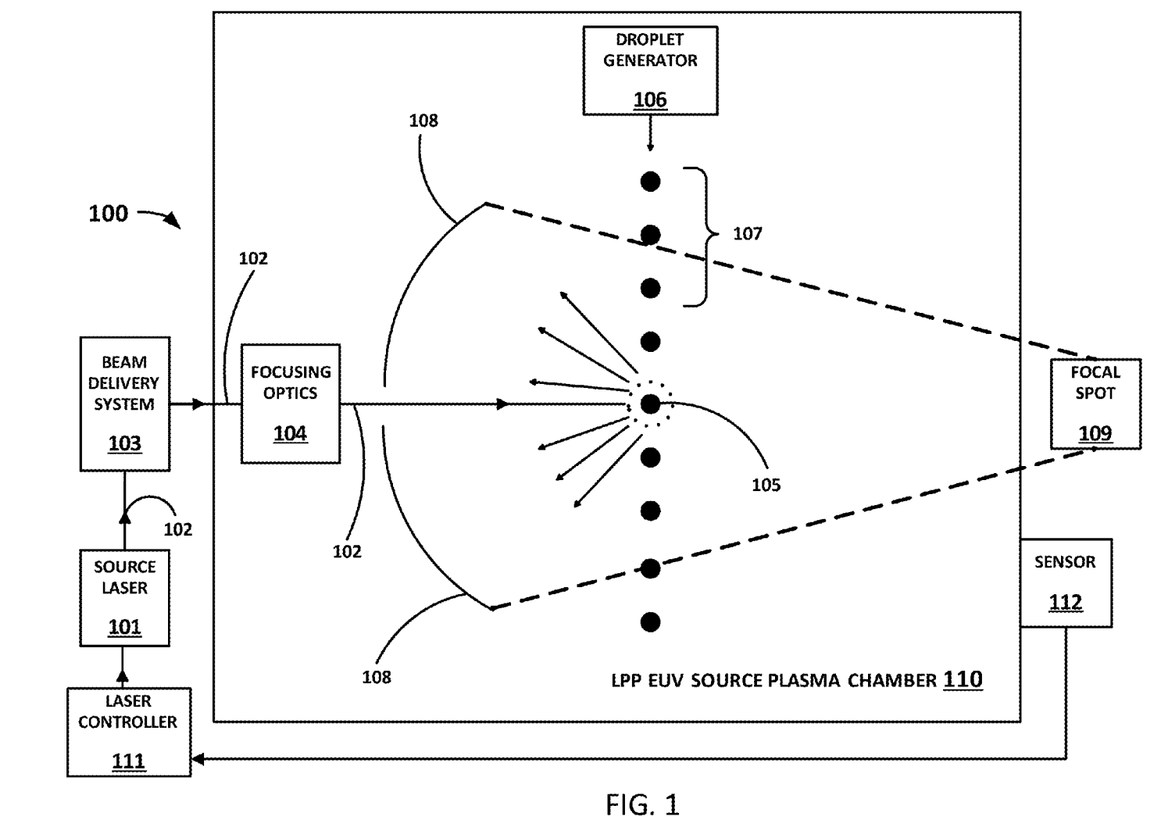
FIG. 1 is an illustration of some of the components of a typical embodiment of an LPP EUV system that may be used with prior art techniques as well as those described herein.

FIG. 1 illustrates a cross-section of some of the components of a typical LPP EUV system 100 as is known in the prior art. A source laser 101, such as a CO2 laser, produces a laser beam, or typically a series of pulses, 102 that passes through a beam delivery system 103 and through focusing optics 104. Beam delivery system 103 typically contains one or more amplifiers that amplify the pulses from source laser 101. Focusing optics 104 may, for example, be comprised of one or more lenses or mirrors, and has a nominal focal spot at an irradiation site 105 within a plasma chamber 110. In some embodiments, there may be multiple source lasers 101, with beams that all converge on focusing optics 104.

A droplet generator 106 produces droplets 107 of an appropriate target material that, when hit by laser beam 102, produces a plasma which emits EUV light. In some embodiments, droplets may be produced, and laser pulses fired, at a rate of 50,000 per second (50 kilohertz, or 50 kHz).

Irradiation site 105 is preferably located at a focal spot of collector 108, which has a reflective interior surface and focuses the EUV light from the plasma at EUV focus 109, a second focal spot of collector 108. For example, the shape of collector 108 may comprise a portion of an ellipsoid. EUV focus 109 will typically be within a scanner (not shown) containing pods of wafers that are to be exposed to the EUV light, after it was processed by the scanner optic (not shown).

A laser controller 111 controls the firing of the source laser 101. In various embodiments, the laser controller 111 determines how to fire source laser 101 based upon data from a sensor 112. For example, in the packet-based dose control of the prior art, sensor 112 measures the EUV energy generated by each pulse of source laser 101 and the accumulated EUV energy generated for the droplets in the packet is then calculated. If the target dose for a packet has been exceeded before all of the droplets in the packet have passed through irradiation site 105, laser controller 111 causes source laser 101 to fire at a time or times that does not correspond to the presence of droplets, in order to miss the remaining droplets in the packet.

In some alternative embodiments, instead of changing the timing of the firing of source laser 101, laser controller 111 may cause the laser pulse from source laser 101 to be directed to a location other than irradiation site 105 in order to miss droplets. In such cases, laser controller 111 may send a signal to beam delivery system 103 and/or focusing optics 104 via a communication link (not shown) in order to do so.

Similarly, in the case of pulse modulation, sensor 112 measures the EUV energy generated and the accumulated total EUV energy is then calculated. Controller 111 may cause laser source 101 to fire a shortened pulse or one of reduced power, or to apply less amplification than the maximum amplification of which the system is capable, based upon a determination of whether the average EUV energy per pulse is greater or less than the desired average EUV energy.

Alternatively, with changes to the logic or programming in laser controller 111, LPP EUV system 100 may also perform EUV dose control as described herein. As in pulse modulation, if the delivered total dose meets or exceeds the desired average dose, laser controller 111 may cause source laser 101 to fire a shortened pulse or one of reduced power, or to amplify the pulse by a lower amount than the maximum possible. If controller 111 determines that such a pulse of reduced power is below the nominal minimum that the system can deliver, then controller 111 can cause the pulse to miss the next droplet by firing the source laser off-target or at the wrong time.

Determining when a target dose, i.e., the desired total EUV energy dose to be applied to an object, has been reached is typically accomplished by measuring the EUV energy generated when each pulse hits a droplet, and integrating the result to determine the total EUV energy generated so far; exposure of the object being treated is stopped when the desired dose target is reached. Thus, it might appear that the best way to arrive at a desired dose target is to divide the desired total EUV energy needed by some number of pulses, and then generate that number of pulses to create an appropriate average EUV energy per pulse so as to obtain the desired total. However, such a simplistic solution is neither easy nor optimal.

Since the amount of EUV energy released when a laser pulse hits a droplet varies with the power in the laser pulse, the EUV light energy generated by any given droplet may also vary. For example, in some current EUV systems, the nominal EUV energy generated by each pulse is expected to be between 1.05 and 1.20 millijoules (mJ), depending upon the width of the pulse, which may be between 45 and 100 nanoseconds (ns). At such energies, pulse counts in the range of 1000 to 5000 are common.

A simplistic approach would be to select a nominal EUV energy per pulse and then attempt to generate pulses that produce such EUV energy constantly until the overall dose target is reached. However, generating EUV energy is not so simple, due in part to the fact that the energy created by each laser pulse varies significantly even under the best of conditions. As is known to those of skill in the art, the actual energy generated by a specific pulse striking a droplet will vary from the nominal EUV energy that is expected due to such things as variations in droplet size, the precise timing of the striking of the droplet by a laser pulse, and effects caused by the EUV plasma resulting from other droplets. This will typically result in actual pulse energy values of from approximately 0.5 to 1.5 mJ, although the majority of pulses will fall within the nominal range of 1.05 to 1.20 mJ.

As is known to those of skill in the art and further discussed below, typical EUV systems are run to generate pulses at less than the nominal maximum EUV energy per pulse. This difference is known as the "dose margin," which is the difference between the maximum power that the system can theoretically produce and the amount of power that is desired. For example, in the example above where the nominal maximum is 1.20 mJ per pulse, if the target EUV output is 1.05 mJ per pulse the dose margin is 12.5%, since 1.05 mJ is 87.5% of 1.20 mJ.

As above, in pulse control mode laser pulses are fired at droplets and the resulting EUV energy created by the pulses is measured and integrated until the dose target is met or exceeded, at which point subsequent pulses are caused to miss the droplets so no further EUV energy is created. However, also as above, this can result in large gaps during which no EUV energy is created, which in turn affects the uniformity and stability of the plasma, causing further undesirable variations to the uniformity of the EUV energy created.

As above, pulse modulation attempts to fire at every droplet by adjusting the pulse duration and/or magnitude by use of an actuator such as an electro-optic modulator (EOM), an acousto-optic modulator (AOM), and/or an RF actuator to control the amount of energy in the laser pulse, and thus the amount of EUV energy that will be created when the laser pulse hits a droplet. In a system such as system 100 shown in FIG. 1, the EOM and AOM actuator(s) are typically located in the source laser 101, while the RF actuator is typically located in the beam delivery system 103, but in some embodiments it may be possible to locate them elsewhere in the system.

As above, the energy of a pulse from the source laser 101, and thus the nominal EUV that is produced by the pulse, is determined by the height, width and amplification of the pulse. There are thus three different mechanisms that may be used to regulate the energy of the pulse; the amplitude or height of the pulse that goes to the amplifiers may be reduced by the use of an AOM, the width of the pulse may be regulated by the use of an EOM, and/or the amplification of the pulse may be regulated by controlling the RF energy applied to one or more amplifiers used to amplify the pulse. The minimum energy of a pulse, and thus the minimum nominal EUV that may be produced by the pulse, is limited by the ranges of the various devices used to control the height, width and amplification of the pulse.

As is known in the art, the performance of devices such as EOMs, AOMs and amplifiers will in some cases change with time, i.e., how long the device has been operating, or the ambient temperature of the environment in which the device is located. In this context, a device is considered to operate in a linear manner over a length of time or a particular temperature range if the performance of the device does not change over that time or temperature range, i.e., the output corresponding to a given input does not change with time or temperature.

It is expected that it will generally be preferable to operate a device within the range in which it operates in a linear manner so that the results of its operation are predictable. One of skill in the art will appreciate that selecting which of the three mechanisms above, AOM, EOM or RF energy, to use to reduce the energy of a pulse may thus depend upon which mechanism is the most linear over the largest range.

In some situations, it is believed that using an RF actuator to alter the amplification of the pulse has the greatest range of time and temperature over which the response is consistently linear. A system such as that shown in FIG. 1 may have from one to four amplifiers, and each amplifier may be adjusted to provide from 40% to 100% of the maximum possible amplification. In practice, the chain may typically provide anywhere from 70% to 100% of the maximum possible amplification.

In other situations, an AOM may be used to reduce the energy of a pulse, as an AOM also has good linearity over a good range. An AOM may typically reduce the amplitude of the pulse from the source laser by up to 90%, which may result in the pulse fed to the amplifier(s) having from 80% to 100% of the energy of the pulse produced by the source laser.

The last choice is the EOM, as it has the smallest range and is not as linear over time as either an RF actuator or an AOM. As will be discussed in more detail below, by reducing the pulse width from the source laser the EOM can only decrease the energy in the pulse by about 10% or so.

While the following discussion uses an EOM as an example of how the present invention improves on some of the issues that are not solved by the prior art, one of skill in the art will appreciate that any of these devices, i.e., an EOM, AOM or RF actuator, may be used to regulate pulse energy and resulting EUV energy, and will be able to select the type of actuator that is appropriate for a given situation based upon the type of drive laser and other factors.

The minimum width that can be applied to a pulse by an EOM is about 40 to 45 nanoseconds (ns), which places a de facto lower limit on a target dose, equal to the nominal energy generated by a sequence of pulses all at the minimum width if only the EOM is used to reduce pulse energy. With pulse widths of 45 to 100 nanoseconds a typical EUV system might be able to produce pulses that nominally create EUV energy of 1.05 mJ to 1.20 mJ per pulse. Pulse modulation does not provide for nominal EUV energy below that which will be created by the narrowest pulse width of which the actuator is capable.

Further, if the lower limit of target dose is desired, corresponding to the narrowest pulse width the actuator can provide, this will require that the actuator operate continuously at the lower limit of its range, which is not a preferred mode of operation. Finally, at pulse widths around 40 or 45 ns, the EUV energy is more sensitive to changes in pulse width, so that the controller can regulate only a narrow range of target dose in that region; in this case only EUV target doses with little dose margin can be used, and only small disturbances to the target dose can be rejected.

Figure 2:
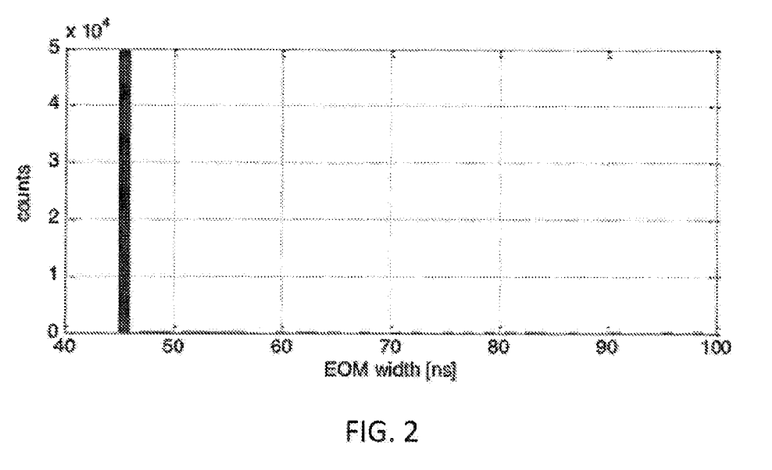
FIGS. 2 to 4 are graphs showing various features of the typical operation of an LLP EUV system using prior art pulse modulation for dose control where the desired average output energy of pulses is lower than the nominal minimum energy that the system can deliver.
Figure 3:
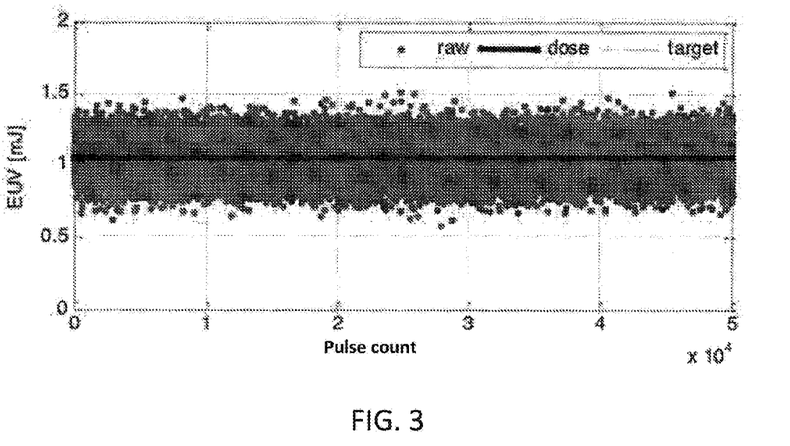
Figure 4:
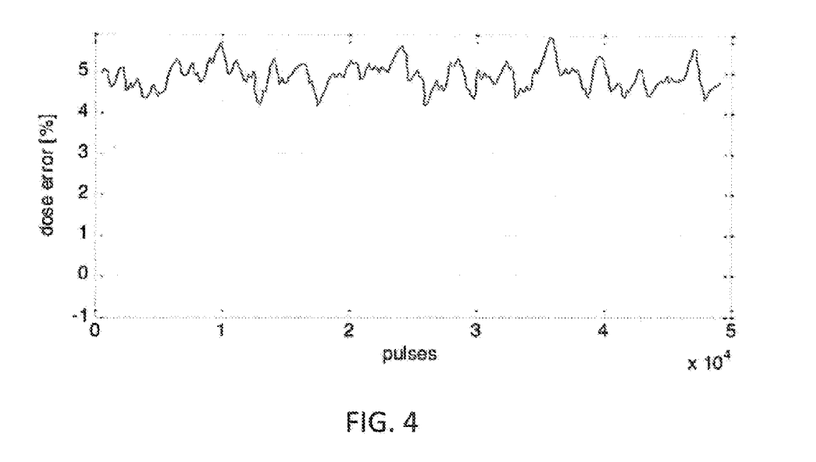

Consider a situation in which the desired dose target and average EUV energy per pulse requires pulse widths below what an actuator can provide. FIGS. 2 through 4 illustrate some of the issues described above that arise with pulse modulation in such a case. As above, in some current EUV systems the average energy from each pulse is expected to be between 1.05 and 1.20 millijoules (mJ); as is known to those of skill in the art, this will result in actual pulse energy values of from approximately 0.5 to 1.5 mJ, although the majority of pulses will fall within the nominal range of 1.05 to 1.20 mJ. The corresponding width of each pulse will be between 45 and 100 nanoseconds (ns).

Suppose that a particular dose target is selected, and then a number of pulses selected to achieve that dose target that requires an average energy per pulse of 1.0 mJ, which is below the nominal minimum energy per pulse of 1.05 mJ. In such a case, a controller performing conventional pulse modulation according to the prior art will measure the EUV energy generated after each pulse and will determine that the next pulse should generate an amount of energy in order to keep the average energy per pulse at 1.0 mJ.

However, since the system is only capable of generating pulses that result in EUV energy of 1.05 mJ, in an attempt to keep the average energy as close to 1.0 mJ per pulse the controller will cause every pulse to be at the minimum pulse width of 45 ns and the minimum nominal pulse energy of 1.05 mJ. One result of this is shown in FIG. 2, which is a histogram showing the distribution of pulse widths produced by the actuator; as above, every pulse is at the minimum pulse width of 45 ns.

As above, the actual EUV energy generated by a pulse in this situation may range from just over 0.5 mJ to about 1.5 mJ, with the average being the nominal minimum energy of 1.05 mJ.

FIG. 3 is a graph of the distribution of the EUV energy generated by the pulses. A few of the pulses generate EUV energy at the extreme values of 0.5 mJ or 1.5 mJ, with most of the pulses clustered around the nominal minimum energy of 1.05 mJ.

FIG. 4 is a graph showing the average dose error of the total dose delivered by all of the pulses compared to the dose that would have been delivered if the pulses had the desired average energy of 1.0 mJ per pulse. The dose error fluctuates as the energy of the individual pulses varies, but fluctuates around 5% as should be expected, given that the desired average energy is 1.0 mJ per pulse, while the system cannot deliver pulses with less than an average energy of 1.05 mJ.

By contrast, FIGS. 5 to 8 show how a system according to one embodiment combining pulse modulation with pulse control mode can achieve the desired result that pulse modulation alone is unable to accomplish when the desired average EUV energy per pulse requires a pulse width that is less than the minimum width the actuator can provide. As above, in the present embodiment, when the average energy of the accumulated pulses exceeds the desired average, and the controller determines that a next pulse should provide EUV energy of less than the minimum nominal energy, the next pulse is skipped.

Although as above the actuator cannot generate a pulse width that will cause the pulse hitting a droplet to generate the nominal 1.0 mJ EUV energy per pulse that is desired, now a droplet may be skipped when necessary, so that the average EUV energy per pulse may be lower than pulse modulation alone can produce. This allows the system to produce lower average EUV energy at a uniform rate that is lower than can be produced by pulse modulation alone, while maintaining other advantages of pulse modulation, such as more uniformity than provided by pulse control mode.

Figure 5:
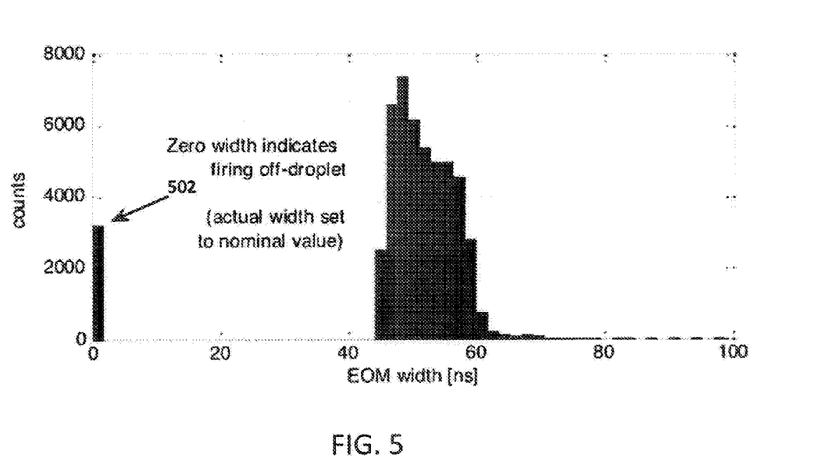
FIGS. 5 to 8 are graphs showing various features of the operation of an LLP EUV system using one embodiment of dose control combining pulse modulation and pulse control mode where the desired average output energy of pulses is lower than the nominal minimum energy that the system can deliver.

FIG. 5 is a graph showing how the pulse widths of the pulses might be distributed in such a situation; there is a distribution of pulses between 45 ns and 100 ns, corresponding to pulse energies of 1.05 mJ to 1.20 mJ as above. However, unlike the situation shown in FIG. 2 for pulse modulation alone, now as shown in FIG. 5 there is also a small portion 502 of the pulses that have a "pulse width" of zero, meaning that those pulses are fired in a direction or at a time so as to miss the droplets and create no pulse energy.

Figure 6:
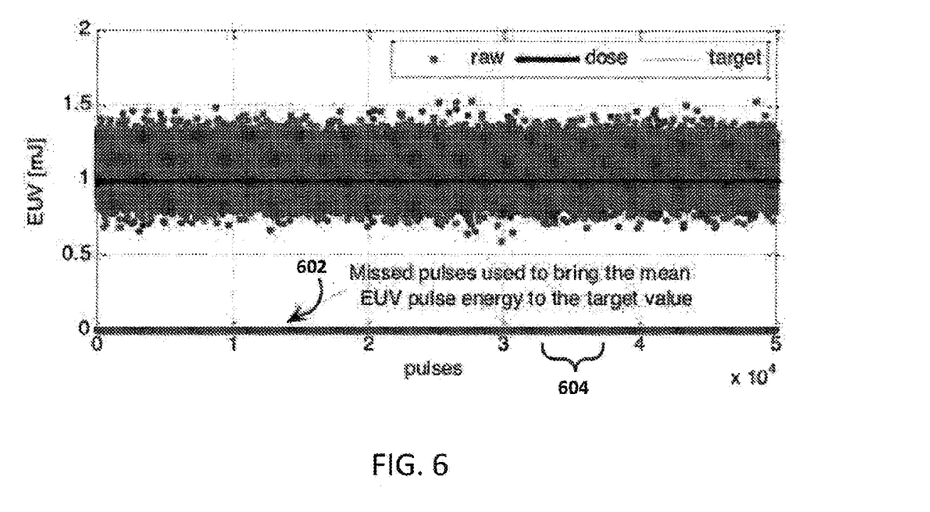

FIG. 6 is a graph of the pulse energies created by the pulses in this embodiment; as in the case of pulse modulation alone, FIG. 6 shows that most of the pulses still create pulse energy of between 0.5 mJ and 1.5 mJ per pulse. However, as also seen in FIG. 5, in this embodiment some of the pulses miss the droplets entirely and produce no energy, as shown by the line 602 along the x-axis of FIG. 6.

Figure 7:
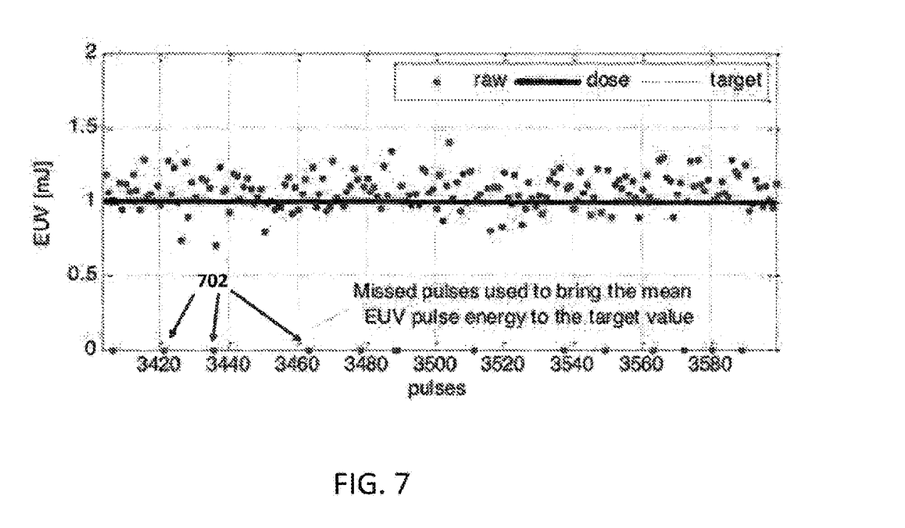

FIG. 7 shows an expanded view of one portion 604 of the graph of FIG. 6, and again shows that most of the pulses create pulse energy of between 0.5 mJ and 1.5 mJ per pulse, with most again falling in the nominal range of 1.05 mJ to 1.2 mJ. In addition, it can now be seen more clearly that a few of the pulses in this portion 604 of the graph of FIG. 6 generate no energy, again because the laser is fired to miss the droplet in those instances.

In the expanded view of FIG. 7 the pulses 702 which generate zero energy, as they do not strike droplets, are relative few in number compared to all of the pulses fired, and are spread approximately equally across the total number of pulses fired, and not clustered together as in pulse control mode. This allows for more a more uniform plasma temperature, and thus a more uniform generation of EUV energy.

Figure 8:
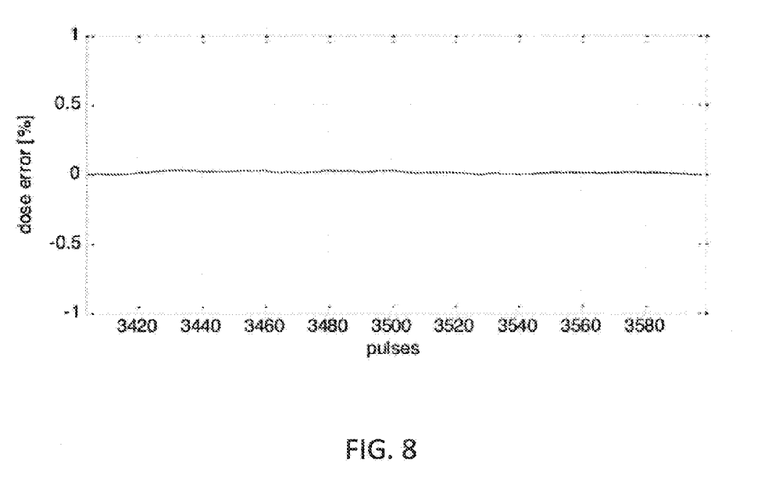

FIG. 8 is a graph of the average dose error using this embodiment combining pulse modulation and pulse control mode. Now the average error fluctuates at a value near zero, as the ability to produce pulses having no resulting EUV energy allows the system to produce EUV energy having an average value of 1.0 mJ per pulse, below the nominal minimum energy of the system of 1.05 mJ per pulse.

In the present approach, as in the prior art, pulse modulation provides some control of the energy produced by each pulse, which pulse control mode does not provide. In addition, however, unlike prior art pulse modulation, in which all pulses hit droplets even if at the minimum width and resulting minimum EUV energy, the present approach also allows for a pulse to miss a droplet and generate zero energy. Only an occasional droplet will be missed in order to maintain the desired average EUV energy, as shown in FIG. 7, rather than a number of droplets in a row as in pulse control mode, to maintain the desired average EUV energy.

As above, the use of an EOM is again only one of three mechanisms that may be used to reduce the energy of a pulse that irradiates a droplet, and thus to reduce the EUV energy produced by irradiating that pulse. One of skill in the art will appreciate how the above discussion will also apply to the use of an RF actuator or an AOM, and will be able to determine which mechanism, or some combination thereof, will be the best or easiest to use in a particular situation, and in what order they will be employed. In some embodiments, a first mechanism may be used and another mechanism then used in combination with the first mechanism only if the first mechanism cannot achieve the desired lower range of power regulation. In other embodiments, only a single mechanism may be used before a droplet is skipped. In an extreme case, all three mechanisms may be used and the next droplet skipped if the energy that will be generated will still exceed what is desired.

This ability to include both modulated pulses as in pulse modulation and pulses that generate zero EUV energy as in pulse control mode thus allows for greater control of the dose of EUV energy applied to a target, such as an item being processed then either pulse control mode or pulse modulation alone. In addition, since fewer droplets will typically be skipped than in pulse control mode and will be spaced out in time rather than occur consecutively, the generated EUV energy will be more uniform over time. Still further, unlike pulse modulation, the combination of both techniques allows the average EUV energy generated per laser pulse to be less than would be possible using pulse modulation alone.

Figure 9:
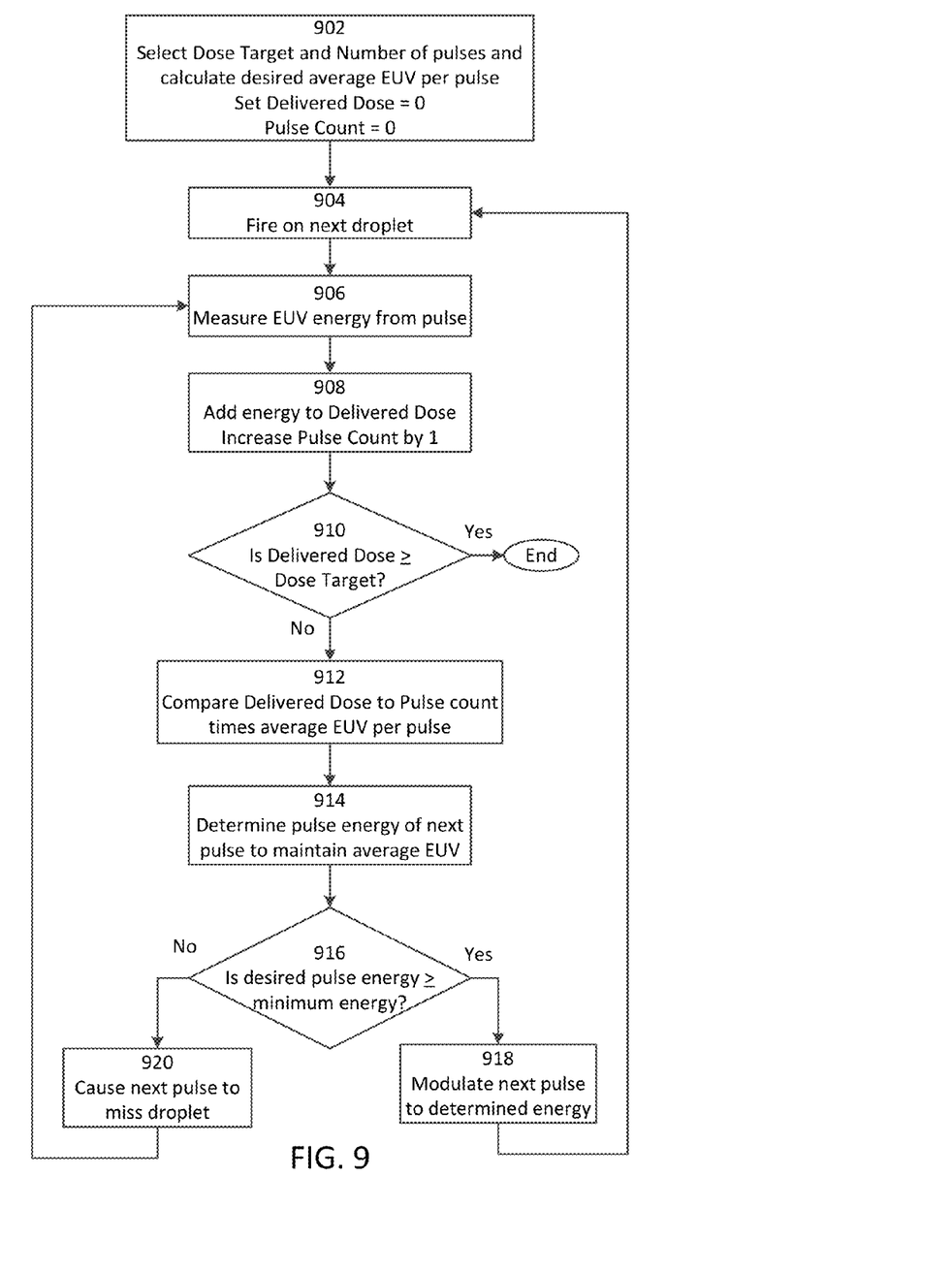
FIG. 9 is a flowchart of a method for improving the control of a dose of EUV radiation generated by an LPP EUV light source according to one embodiment.

FIG. 9 is a flowchart of a method combining pulse modulation and pulse control mode that may be used for dose control in an LPP EUV system according to one embodiment.

At step 902, several values are selected by being received and/or set in a controller, for example, laser controller 111 of FIG. 1, for use in the method. The controller will typically contain, for example, a processor capable of running software or logic for storing program instructions, and a memory for storing various values as described herein.

First, a dose target is chosen for a desired amount of EUV energy that is to be delivered to the object being processed, and a number of pulses over which the dose target is to be delivered. The dose target should be chosen in an amount that will have a desired effect on the object being processed; for example, a dose target might be chosen in an amount that will result in a layer of photoresist applied to a semiconductor wafer being properly exposed.

The number of pulses may be chosen so that an average energy per pulse needed to achieve the dose target over the number of pulses is in an amount below the nominal maximum energy per pulse of the system. This allows the average energy per pulse required to obtain the dose target to provide an adequate dose margin. As above, it is desirable that the average energy per pulse not be so low as to cause a large number of missed droplets to be necessary.

The dose target and number of pulses may be selected or input by an operator of the system, or may alternatively be stored in a memory containing appropriate predetermined values for desired operations and retrieved by the controller.

Two more values are used to track the progress of the method. One value is the EUV energy that has been delivered to the object being processed, and is here called "Delivered Dose." Another value is the number of laser pulses that have contributed to Delivered Dose, and is here called Pulse Count. Both Delivered Dose and Pulse Count are initially set to zero.

At step 904, a controller or other logic device, such as laser controller 111 in FIG. 1, causes the laser, such as source laser 101 in FIG. 1, to fire a laser pulse on the next droplet.

At step 906, the EUV energy created by the droplet is measured, for example, by sensor 112 in FIG. 1. If the droplet was hit, there will be some positive value of EUV energy. If the droplet was missed, the value of the energy created will be zero.

At step 908, the controller adds the EUV energy created by the droplet measured at step 210 to the Delivered Dose, and increases the value of Pulse Count by 1.

At step 910 the controller compares Delivered Dose to the value of Dose Target. If Dose Target has been reached, the current process ends and a new process may be commenced upon the same object or a different object as appropriate. The comparison may be done by subtracting one value from the other, or by other means known to those of skill in the art.

If Dose Target has not been reached, at step 912 the controller compares Delivered Dose to Pulse Count times the average EUV energy per pulse. Thus, the controller determines whether the total EUV energy created so far is greater or less than the number of pulses delivered times the nominal average energy per pulse.

At step 914, the controller determines what the desired energy of the next pulse should be. It does this by calculating the source laser pulse energy that should result in an expected nominal amount of EUV energy that would result in the next value of Delivered Dose being equal to the next value of Pulse Count times the nominal average energy per pulse.

At step 916 the controller determines whether the determined desired pulse energy is within the range of the selected actuator(s). As above, the controller may be programmed to use only a single control mechanism and actuator or some combination and/or sequence of more than one (RF, AOM and/or EOM), to determine whether the desired pulse energy can be achieved by use of the selected actuator(s).

If the desired pulse width is within the range of the actuator, at step 918 the controller causes the actuator to modulate the next laser pulse to the desired width, and the process returns to step 904 at which the modulated pulse is fired at the next droplet.

If, on the other hand, the desired pulse width is not within the range of the actuator, at step 920 the controller causes the source laser to fire the next pulse at a time or in a direction such that the next droplet will be missed, and the process returns to step 906, at which the measured EUV energy from the next pulse will be zero. (Alternatively, the process could assume zero energy without actually measuring it and return to step 908, but measuring as described allows for erroneously hitting a droplet in this situation.)

It may be seen that in this way the method keeps track of the total EUV energy that has been delivered to an object from the pulses and adjusts the next pulse to keep the delivered EUV energy on as uniform a schedule as possible. After each pulse, that total EUV energy delivered is compared to the proportion of the dose target that should have been delivered by the proportion of pulses delivered so far.

In the embodiment using only an EOM described above, if possible, the expected energy from the next pulse is selected, by selecting the pulse width using pulse modulation, to keep the delivered EUV energy on a proportional schedule. If pulse modulation cannot reduce the expected EUV energy from the next pulse enough to return the total delivered EUV energy to a proportional track, a pulse misses the next droplet, which is likely to require the next pulse to produce more energy than average.

As above, the number of droplets may typically be in the range 1000 to 5000, the range of nominal EUV energy delivered by each pulse is typically in the range of 1.05 mJ to 1.20 mJ when only an EOM is used, and the range of actual EUV energy is in the range of 0.5 mJ to 1.5 mJ. In such cases, using the combination of pulse control mode and pulse modulation will allow for the delivery of total EUV energy at an average rate below the nominal minimum of the system in a way that is significantly more uniform than pulse modulation alone, as seen in FIG. 8.

As above, one of skill in the art will appreciate that any combination of one or more of the mechanisms of an RF actuator, AOM and/or EOM may be used to obtain a desired pulse energy. This may often be accomplished with existing systems; for example, the system illustrated in FIG. 1, able to perform either pulse control mode dose control or pulse modulation, may also be used to perform the methods described herein. Sensor 112 still measures the amount of EUV energy from each pulse, and laser controller 111 may be programmed to perform the steps described above.

It will be apparent to one of skill in the art that the methods and apparatus described herein result in advantages over the prior art above. As seen in FIG. 7, it is expected that where pulse modulation is insufficient to keep the delivered dose on an appropriate path, only an occasional droplet will need to be missed in order to bring the delivered dose back under the expected value, rather than the larger numbers of droplets that may need to be missed in pulse control mode dose control. In addition, unlike the EUV stabilization dose control of the prior art, in various implementations of the described methods and apparatus the laser source, such as laser source 101, may be more able to fire at sufficient power to prevent self-lasing due to incomplete power extraction and reduce unwanted reflections that may damage optical components.

The disclosed method and apparatus have been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above.

Different algorithms and/or logic circuits than those disclosed herein may be used. It will be apparent to those of skill in the art that certain steps in the described methods may be performed in a different order or simultaneously; for example, step 918 may be executed substantially simultaneously with step 904.

While certain examples have been provided of various configurations, components and parameters, one of skill in the art will also be able to determine other possibilities that may be appropriate for a particular LPP EUV system. Different types of source lasers, sensors, focus lenses and other optics, or other components, or different frequencies of droplets and pulses may be used.

It should also be appreciated that the described method and apparatus can be implemented in numerous ways, including as a process, an apparatus, or a system. The methods described herein may be implemented in part by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc. In some embodiments the program instructions may be stored remotely and sent over a network via optical or electronic communication links. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A method for controlling a dose of extreme ultraviolet (EUV) radiation generated by a laser produced plasma (LPP) EUV light source, the LPP EUV light source creating EUV energy by firing source laser pulses that are modulated in energy by one or more actuators such that each pulse has a range from a minimum pulse energy to a maximum pulse energy, the pulse energy corresponding to a nominal amount of EUV energy to be produced by the pulse, and capable of hitting droplets of target material with a laser pulse, comprising:

receiving, by a controller, a selected EUV dose target and a number of laser pulses over which the dose target is to be achieved;

determining, by the controller, a desired average EUV energy per pulse to be generated in order to achieve the dose target over the number of laser pulses;

causing, by the controller, the light source to fire a pulse to hit a droplet;

measuring, by a sensor, the EUV energy created by the laser pulse hitting the droplet;

adding, by the controller, the measured EUV energy to a running total of the EUV energy generated by laser pulses that have been fired;

determining, by the controller, a difference between the running total of the EUV dose and the desired average EUV energy per pulse times the number of pulses fired and, from the determined difference, a desired pulse energy for a next laser pulse;

if the desired pulse energy for the next laser pulse is within the range of pulse energy that may be modulated by the actuators:

causing, by the controller, the light source to fire a next laser pulse to hit a subsequent droplet; and causing, by the controller, one or more of the actuators to modulate the pulse energy of the next laser pulse to the desired pulse energy; and if the desired pulse energy for the next laser pulse is not within the range of the actuators:
    causing, by the controller, the light source to fire a next laser pulse to not hit a droplet.

2. The method of claim 1 wherein the desired average EUV energy per pulse is less than the nominal amount of EUV energy corresponding to the minimum pulse energy to which a laser pulse may be modulated by any combination of the one or more actuators.

3. The method of claim 1 wherein the LPP EUV light source includes an amplifier, and one of the one or more actuators comprises a radio frequency actuator configured to apply radio frequency energy to the amplifier.

4. The method of claim 1 wherein one of the one or more actuators comprises an acousto-optic modulator configured to modulate the amplitude of source laser pulses.

5. The method of claim 1 wherein one of the one or more actuators comprises an electro-optic modulator configured to modulate the width of source laser pulses.

6. The method of claim 1 wherein causing, by the controller, one or more of the actuators to modulate the pulse energy of the next laser pulse to the desired pulse energy further comprises:
    determining, by the controller, whether a first one of the one or more actuators is able to modulate the pulse energy of the next laser pulse to the desired pulse energy, and, if so, causing the first one of the actuators to modulate the pulse energy of the next laser pulse to the desired pulse energy.

7. The method of claim 6 wherein the LPP EUV light source includes an amplifier, and the first one of the one or more actuators comprises a radio frequency actuator configured to apply radio frequency energy to the amplifier.

8. The method of claim 6 wherein, if the first one of the one or more actuators is not able to modulate the pulse energy of the next laser pulse to the desired pulse energy, causing, by the controller, one or more of the actuators to modulate the pulse energy of the next laser pulse to the desired pulse energy further comprises:
    determining, by the controller, whether a combination of the first one of the actuators and a second one of the one or more actuators is able to modulate the pulse energy of the next laser pulse to the desired pulse energy, and, if so, causing the first and second ones of the one or more actuators to modulate the pulse energy of the next laser pulse to the desired pulse energy.

9. The method of claim 8 wherein the LPP EUV light source includes an amplifier, the first one of the one or more actuators comprises a radio frequency actuator configured to apply radio frequency energy to the amplifier, and the second one of the one or more actuators comprises an acousto-optic modulator configured to modulate the amplitude of source laser pulses.

10. A system for controlling a dose of extreme ultraviolet (EUV) radiation generated by a laser produced plasma (LPP) extreme EUV light source, the LPP EUV light source creating EUV energy by firing source laser pulses capable of hitting droplets of target material with a laser pulse, comprising:
    one or more actuators configured to modulate the energy of a laser pulse, having a range from a minimum pulse energy to a maximum pulse energy, the pulse energy corresponding to a nominal amount of EUV energy to be produced by the laser pulse;
    a sensor configured to measure the EUV energy created by a laser pulse hitting a droplet;
    a controller configured to:
        receive a selected EUV dose target and a number of laser pulses over which the dose target is to be achieved;
        determine the desired average EUV energy per pulse to be generated in order to achieve the dose target over the number of laser pulses;
        cause the light source to fire a laser pulse hit a droplet;
        add the measured EUV energy created by each laser pulse to a running total of the EUV energy generated by laser pulses that have been fired;
        determine the difference between the running total of the EUV dose and the desired average EUV energy per pulse times the number of pulses fired and, from the determined difference, and a desired pulse energy for a next laser pulse;
        if the desired pulse energy for a next laser pulse is within the range of pulse energy that may be produced by the actuators:
            cause the light source to fire a next laser pulse to hit a droplet; and
            cause one or more of the actuators to modulate the pulse energy of the next laser pulse to the desired pulse energy; and
        if the desired pulse energy for the next laser pulse is not within the range of the actuators:
            cause the light source to fire a next laser pulse to not hit a droplet.

11. The system of claim 10 wherein the desired average EUV energy per pulse is less than the nominal amount of EUV energy corresponding to the minimum pulse energy to which a laser pulse may be modulated by any combination of the one or more actuators.

12. The system of claim 10 further comprising an amplifier, and wherein one of the one or more actuators comprises a radio frequency actuator configured to apply radio frequency energy to the amplifier.

13. The system of claim 10 wherein one of the one or more actuators comprises an acousto-optic modulator configured to modulate the amplitude of source laser pulses.

14. The system of claim 10 wherein one of the one or more actuators comprises an electro-optic modulator configured to modulate the width of source laser pulses.

15. The system of claim 10 wherein the controller is further configured to cause one or more of the actuators to modulate the pulse energy of the next laser pulse to the desired pulse energy by:
    determining whether a first one of the one or more actuators is able to modulate the pulse energy of the next laser pulse to the desired pulse energy; and,
    if the first one of the actuators is able to modulate the pulse energy of the next laser pulse to the desired pulse energy, causing the first one of the actuators to modulate the pulse energy of the next laser pulse to the desired pulse energy.

16. The system of claim 15 further comprising an amplifier, and wherein one of the one or more actuators comprises a radio frequency actuator configured to apply radio frequency energy to the amplifier.

17. The system of claim 15 wherein the controller is further configured, if the first one of the actuators is unable to modulate the pulse energy of the next laser pulse to the desired pulse energy, to:
    determine whether a combination of the first one of the actuators and a second one of the one or more actuators is able to modulate the pulse energy of the next laser pulse to the desired pulse energy; and if the combination of the first one of the actuators and a second one of the one or more actuators is able to modulate the pulse energy of the next laser pulse to the desired pulse energy, cause the first and second ones of the one or more actuators to modulate the pulse energy of the next laser pulse to the desired pulse energy.

18. The system of claim 17 further comprising an amplifier, and wherein the first one of the one or more actuators comprises a radio frequency actuator configured to apply radio frequency energy to the amplifier and the second one of the one or more actuators comprises an acousto-optic modulator configured to modulate the amplitude of source laser pulses.

19. A non-transitory computer readable storage medium having embodied thereon instructions for controlling a dose of extreme ultraviolet (EUV) radiation generated by a laser produced plasma (LPP) EUV light source, the LPP EUV light source creating EUV energy by firing source laser pulses that are modulated in width by an actuator having a range from a minimum width to a maximum width, the width corresponding to a nominal amount of EUV energy to be produced by the pulse, and capable of hitting droplets of target material with a laser pulse, the method comprising:

receiving, by a controller, a selected EUV dose target and a number of laser pulses over which the dose target is to be achieved;

determining, by the controller, a desired average EUV energy per pulse to be generated in order to achieve the dose target over the number of laser pulses;

causing, by the controller, the light source to fire a pulse to hit a droplet;

measuring, by a sensor, the EUV energy created by the laser pulse hitting the droplet;

adding, by the controller, the measured EUV energy to a running total of the EUV energy generated by laser pulses that have been fired;

determining, by the controller, a difference between the running total of the EUV dose and the desired average EUV energy per pulse times the number of pulses fired and, from the determined difference, a desired width for a next laser pulse;

if the desired pulse energy for the next laser pulse is within the range of pulse energy that may be produced by the actuators:

causing, by the controller, the light source to fire a next laser pulse to hit a subsequent droplet; and causing, by the controller, the one or more of the actuators to modulate the pulse energy of the next laser pulse to the desired pulse energy; and if the desired pulse energy for the next laser pulse is not within the range of the actuator:

causing, by the controller, the light source to fire a next laser pulse to not hit a droplet.

* * * * *